United States Patent [19]

Laesser

[11] 4,044,242
[45] Aug. 23, 1977

[54] DATA SELECTION AND DISPLAY ARRANGEMENT FOR A SMALL DEVICE

[75] Inventor: Claude Laesser, La Chaux-de-Fonds, Switzerland

[73] Assignee: Ebauches S.A., Neuchatel, Switzerland

[21] Appl. No.: 573,264

[22] Filed: Apr. 30, 1975

[30] Foreign Application Priority Data

May 3, 1974  Switzerland .................. 6031/74

[51] Int. Cl.² ............................................. G04B 47/00
[52] U.S. Cl. ..................... 235/152; 58/152 R; 340/324 R
[58] Field of Search .................. 235/156, 152, 145 R; 58/152 R; 340/365 R, 324 R; 200/4, 18, 156

[56] References Cited

U.S. PATENT DOCUMENTS

| | | | |
|---|---|---|---|
| 3,575,577 | 4/1971 | Cunnane | 200/156 X |
| 3,803,834 | 4/1974 | Reese | 58/152 R |
| 3,813,533 | 5/1974 | Cone et al. | 235/156 |
| 3,816,730 | 6/1974 | Yamamoto et al. | 235/156 |
| 3,855,461 | 12/1974 | Stockwell | 235/156 |
| 3,911,424 | 10/1975 | Giannuzzi | 340/324 R |
| D. 236,271 | 8/1975 | Herczog | D26/5 C |

FOREIGN PATENT DOCUMENTS

1,391,637   4/1975   United Kingdom .................. 235/152

OTHER PUBLICATIONS

Ludeman & Strait "Wrist Worn Terminal" *IBM Technical Disclosure Bulletin*, vol. 15, No. 11, Apr. 1973 pp. 3350-3351.

"You say a shirt-pocket calculator's too big, buddy. . .?" *Automation*, May 1975, p. 50.

*Primary Examiner*—David H. Malzahn
*Attorney, Agent, or Firm*—Silverman & Cass, Ltd.

[57] ABSTRACT

A selection and display arrangement for a small computer such as one capable of being worn on the wrist and having a dial face. To facilitate accurate entry of the digital and computational function data, display windows are separately provided on the dial face of the computer to display separately the selected digital and function selected data. An additional display window displays the computational result. The dial face carries indicia along its periphery representing the selectable data. Movable key means is mounted for movement around the periphery of the dial face, such that once positioned adjacent the location of a desired data item, a transverse movement of the key means accomplishes data entry.

3 Claims, 1 Drawing Figure

U.S. Patent        Aug. 23, 1977        4,044,242
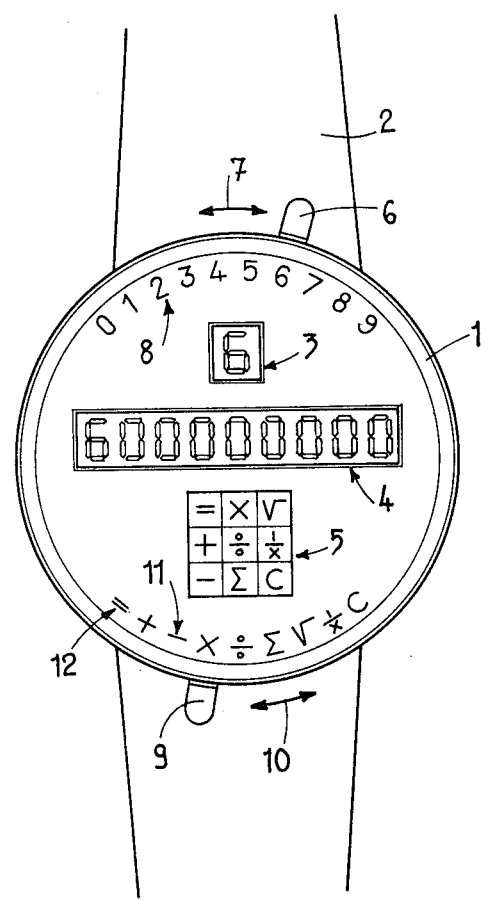

DATA SELECTION AND DISPLAY ARRANGEMENT FOR A SMALL DEVICE

The present invention relates to a data selection and display arrangement for an electronic computer comprising at least a key arranged in such a way that a pressure exerted thereon produces the introduction of data into the computer.

This computer is characterized by the fact that the said key is movable so as to be able to occupy one or the other of several positions, so that the selection of the data to be introduced into the computer be effected while bringing first the said key into this one of its several positions corresponding to the said data, then the properly said introduction of this data be effected while pressing on the said key occupying the said position.

The drawing shows, by way of example, one embodiment of the object of the invention.

The sole figure is a plane view of a data selection and display arrangement for an electronic computer able to be carried at the wrist like a wrist-watch.

The electronic computer represented comprises a casing 1 which can be secured, by means of a bracelet 2, to the wrist. Its upper face is provided with three windows 3, 4 and 5 in which appear the indications displayed by electro-optic means, for instance by means of liquid crystals. The window 3 serves to the display of the last numeral which has been introduced in the computer, the window 4 serves to the display of the number which is in course of introduction into the computer as well as to the display of the result of the operation once it is effected, the choice of this operation being displayed in the window 5 as a symbol appearing in this window.

The introduction of numerical data is effected by means of a key 6 arranged in such a way as to be able to effect a rotative movement as indicated by the arrow 7, that permits to bring it opposite one or the other of the ten numerals, from zero to nine, which constitute a scale 8, The introduction of numerical data is effected while bringing the key 6 opposite the numeral that it is desired to be introduced, for permitting to effect the selection of this numeral, then while exerting a pressure on the key for producing the introduction properly said of this numeral.

The computer comprises a second key, designated by 9, arranged in such a way as to be able to effect displacements as indicated by the arrow 10 opposite a graduation 11 representing the several operations that can effect the computer. The introduction of the operation which has to be effected by the computer is effected while bringing the key 9 opposite the corresponding symbol of the graduation 11, then while exerting a pressure on the key 9.

Likewise, the execution of the operation is effected by means of the key 9 while bringing it opposite the sign "=" of the graduation 11 and while exerting thereon a pressure. The result of the operation is then displayed in the window 4.

It is to be noted that the electronic diagrams of the computer have not been represented, since they can be realized several ways and since they are out of the scope of the invention.

As a modification, the computer can comprise a timekeeping device, that will permit the display of the time. This display will be effected by means of the same display elements as these ones used for the calculation. The arrangement can be such that the time be displayed permanently, excepted when one operates the computer, in which case the display passes automatically from the time to this one of the indications given by the computer. The return to the display of the time will be effected either automatically, with a timing of 10 to 20 seconds, either by means of one or the other of the control keys.

Also as a modification, one can provide the case where the computer will comprise only one movable key which will be able to be moved opposite two graduations 8 and 12 and which will serve as well for the introduction of the numerical data as for the introduction of the operations which have to be effected by the computer. One can also provide the case where the two graduations 8 and 12 will be situated opposite one to each other. In this case, the computer will comprise, besides the sole movable key, a stationary key permitting to make the selection of the operation of the movable key, i.e. the introduction of the numerical data or the introduction of the operations.

As a modification and in the case where the computer will comprise more that one key, this latter could be made rigid with a ring in such a way that it will not be possible to introduce simultaneously two data.

What I claim is:

1. For use with an electronic calculator through which operations on selected numeric data are performed in accordance with selected functions after entry of the data and functions to produce operational outputs, a selector and display arrangment comprising a casing having a dial face enclosed by a peripheralportion, scale means mounted on the dial face adjacent said peripheral portion bearing indicia corresponding to the numeric data and the functions, at least two display devices for respectively displaying said indicia and the operational outputs, means mounting the display devices in the casing for display of the indicia and the operational outputs on separate displaying areas of the dial face, pressure responsive key means for initial selection of the indicia and subsequent entry of the corresponding numeric data and functions into the calculator, means movably mounting the key means for displacement to different operative positions along the scale means to effect said initial selection and display of the selected indicia on at least one of the said displaying areas prior to entry of the corresponding data and functions into the calculator, and means responsive to pressure exerted on the key means in each of said different positions thereof for said subsequent entry of the selected data and functions to effect display of the operational outputs in another of the displaying areas.

2. An arrangement according to claim 1 in which there are three of said separate displaying areas, two of which are for displaying different indicia corresponding to the numeric data and functions selected.

3. An arrangement according to claim 1 in which the different positions of indicia on said dial face are distributed onto at least two distinctively spaced apart locations, one such location carrying digital data selection indicia and another location carrying computational function selection indicia, and wherein said key means comprises a plurality of key elements, each mounted and movable for selection of the indicia in one of said locations.

* * * * *